Patented Dec. 23, 1941

2,267,685

UNITED STATES PATENT OFFICE 2,267,685

N,N'-LOWER ALIPHATIC DIACYL-N,N'-DICYCLOHEXYL ALKYLENE DIAMINES

Lucas P. Kyrides, Webster Groves, Mo., assignor to Monsanto Chemical Company, St. Louis, Mo., a corporation of Delaware No Drawing. Application July 5, 1938, Serial No. 217,499

7 Claims. (Cl. 260—561)

The present invention relates to a new class of chemical compounds and to their use as modifiers in vinyl resins, particularly in polyvinyl acetal resins. It has particular relation to novel derivatives of cyclohexylamine consisting of diacyl cyclohexyl aliphatic diamines which possess, among other valuable properties, compatibility with and a plasticizing action upon plastic vinyl resin compositions.

The compounds of the present invention are amides corresponding to the general formula

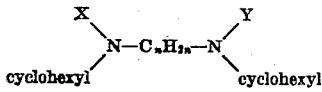

in which the radical —$C_nH_{2n}$— is a lower alkylene radical and the radicals X and Y are acyl groups of lower aliphatic monocarboxylic acids such, for example, as formyl, acetyl, propionyl, butyryl and pentanoyl (valeryl) radicals. The compounds may be referred to generically as N,N'-diacyl-N,N'-dicyclohexyl alkylene diamines and are exemplified by the specific compound, N,N' - diacetyl - N,N' - dicyclohexyl ethylene diamine, which may also be called N,N'-dicyclohexyl ethylene-bis-acetamide or N,N'-dicyclohexyl-alpha, beta-bis-(acetamino) ethane. For convenience in naming, the compounds are referred to generally as derivatives of amines, rather than as derivatives of acids or hydrocarbons, and are referred to herein as such.

The present application is a continuation-in-part of my co-pending application, Serial No. 43,924, filed on October 7, 1935, which has issued as Patent No. 2,126,560, wherein I have disclosed certain of the compounds of the present invention and their use as plasticizing agents in cellulosic compositions.

The main objects of the present invention are to provide new compounds which may easily and economically be prepared, which are compatible with such vinyl resin compositions, particularly polyvinyl acetal resins, which when incorporated therein provide an intimate and permanent mixture of good flexibility and high mechanical strength, and which in such compositions are highly resistant to discoloration by light and which are substantially non-odorous and non-volatile.

These and other objects will be apparent from perusal of the appended specification and the accompanying claims.

Vinyl resins for which the compounds of the present invention are especially useful as modifying agents comprise polymers of styrene; polymers of vinyl esters, such as vinyl acetate; polymers of vinyl halides, such as vinyl chloride; copolymers of vinyl esters and vinyl halides, such as the co-polymers of vinyl acetate and vinyl chloride; and polyvinyl acetal resins. The polyvinyl acetal resins are those resins resulting from the partial hydrolysis of a vinyl ester polymer and subsequent condensation of the partially hydrolyzed product with an aldehyde. The polyvinyl acetal resins appear in commerce under various trade names; those resulting from condensation of a partially hydrolyzed vinyl ester polymer with formaldehyde are known under the trade name "Formvar"; those resulting from condensation with butyraldehyde are known under the name "Butvar." The foregoing are the two most common polyvinyl acetal resins in use but the series includes also resinous condensation products of partially hydrolyzed vinyl ester polymers with acetaldehyde, propionaldehyde and the like.

Vinyl resins are used in the preparation of coating compositions, films, molding compositions and similar materials. Because of the exceptional combination of properties possessed by polyvinyl acetal resins, they have become of outstanding importance in the production of films for use as interlayers in safety glass. Since the vinyl resins are too hard and brittle to be used alone, it is customary to incorporate with them various modifying agents whose purpose it is to soften and flexibilize the resins. The softening or plasticizing agents which are used with cellulosic plastic compositions are not entirely satisfactory for use in vinyl resins because of their lack of compatibility and retentivity, their failure to influence the flexibility without decreasing the toughness of the film or for other reasons. The defects of the common plasticizers for cellulose derivatives are particularly noticeable when these plasticizers are used in polyvinyl acetal resin films for use in safety glass.

The present invention involves the discovery of a new class of compounds obtained by acylation of an aliphatic diamine containing a cyclohexyl group directly attached to each nitrogen atom, and it further involves the discovery that these materials possess properties eminently fitting them for use as plasticizers for vinyl resins. These compounds are of the type represented by the general formula:

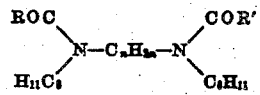

where $n$ is any whole number and R and R' are the same or different radicals selected from the group consisting of hydrogen and lower alkyl radicals.

The preparation of compounds of this type is simple and involves chemical reactions, the general type of which is well understood by those skilled in the art. A preferred method involves the initial reaction of a dihalogenated aliphatic compound, such as ethylene dichloride with cyclohexylamine to form an amino compound of the type of symmetrical dicyclohexyl ethylene diamine. This compound is then converted into the diacyl derivative by reaction in conventional manner with the anhydride of a carboxylic acid, a typical example of the latter being acetic anhydride. It is to be understood that in the first reaction a material excess of cyclohexylamine may be employed and that the acid anhydride should also be preferably in slight excess of the theoretical value in the second reaction. The excess cyclohexylamine of course should be removed, for example, by distillation, prior to acetylation.

In the following examples specific methods illustrating the preparation of compounds constituting the subject matter of the invention are described.

*Example I. Diacetyl dicyclohexyl ethylene diamine.*—Cyclohexylamine (2500 grams) and ethylene dichloride (450 grams) in the molecular ratio of approximately 5 to 1 were reacted. The ethylene dichloride was added with agitation over a period of approximately three hours to the cyclohexylamine maintained at or about its boiling point in an oil bath. Heating and agitation were continued for an additional two hours or longer after all of the ethylene dichloride had been added. The bath was then cooled to about 100° C. and 740 parts by weight of 50% sodium hydroxide solution and 700 parts by weight of water were added. An oily layer resulted and this was separated and the excess cyclohexylamine was distilled off. In order to remove any sodium chloride contained in the dicyclohexyl ethylene diamine left after distilling off the cyclohexylamine, the bath was poured into hot water, agitated, and the oil separated. When cooled, the compound formed a hydrate which was recovered by filtration. This hydrate was then dehydrated by heating in vacuum. Vacuum distillation gave 925 parts by weight, which represents a yield of 90.9% of the theoretical of dicyclohexyl ethylene diamine. This product is so pure that it may be subjected without further purification to acetylation. The product boils at 184-186° at about 25 mm.; or at 318-320° under atmospheric pressure. It is a strongly alkaline substance.

The step of acetylating the dicyclohexyl ethylene diamine may proceed as follows: The 925 parts of dicyclohexyl ethylene diamine, prepared as above described, were charged into a suitable reaction vessel, which was fitted with a reflux condenser. To this charge were added 1010 parts by weight of acetic anhydride. This represented an excess of acetic anhydride over dicyclohexyl ethylene diamine of approximately 20%. The mixture was heated in an oil bath at a temperature of approximately 125°-140° C. for a period of about 12 hours. The product after cooling below 100° was quenched in ice water and the product, which was of granular nature, was filtered off and washed with water. This granular material was dissolved in 1400 parts of boiling alcohol, treated with 12 parts of a suitable decolorizing charcoal, and filtered after some time. The filtrate was treated with 1400 parts of hot water. The diluted solution was cooled to about 5° C. and then filtered.

The crystals, for purposes of further purification, were redissolved in 600 parts of boiling alcohol and treated with an additional 5 parts of decolorizing charcoal, filtered, and then treated with 800 parts of hot water. The water mixture was again cooled to 5° C. after which the crystals were removed by filtration. A yield of 959 parts, approximately 87.5% of the theoretical value of dry material was obtained in this manner.

The white crystalline product was found to have a melting point of 152-153.5° C.

*Example II. Diformyl dicyclohexyl ethylene diamine.*—Into a flask provided with a stirrer, a reflux condenser, and a dropping funnel were placed 350 grams (approximately 1.56 mols) of dicyclohexyl ethylene diamine, which may be the undistilled purified product obtained as described in Example I. The flask is heated by means of an oil bath until its contents reach a temperature of about 60° C. Through the dropping funnel, adjusted to a suitable flow, are slowly added 250 grams of 85% formic acid (approximately 4.6 mols of HCOOH). The temperature rises slowly as the additions of formic acid are made and the additions are made at such a rate that a temperature of about 10° C. is not exceeded. After all the formic acid has been added the reflux condenser is replaced by a suitable horizontal take-off condenser and the oil bath is heated slowly. The water present and excess formic acid in the reaction mixture are allowed to distill off slowly until the mixture attains a temperature of 140° C., this heating and distilling being so regulated that approximately five or more hours are required. It is not essential that all the water be removed. After this period of heating the reaction mixture is poured into cold water, whereupon the insoluble diformyl dicyclohexyl ethylene diamine separates out as a solid. The compound can be separated by filtration and decolorized as in Example I, if desired. The compound can be recrystallized from alcohol. Its melting point after recrystallization is approximately 162° to 163° C.

In using the compounds of the invention as plasticizers, they may be incorporated by any of the conventional methods, that is, they may be brought into admixture by means of solvents, especially when the resulting composition is to be used as a coating composition, or they may be incorporated on conventional heated rolls. For polyvinyl acetal resins, the preferred method of incorporation consists in kneading the resin while hot with the plasticizer. The plasticizers of the present invention are soluble in acetone, alcohols, esters such as ethyl acetate, hydrocarbons such as benzene, toluene, and petroleum spirits.

As examples of compositions containing the plasticizers of the invention and the method of preparing them the following are typical.

*Example III.*—A film is made by kneading together at about 100° C. a mixture consisting of 100 parts by weight of "Butvar" resin and 30 parts by weight of diacetyl dicyclohexyl ethylene diamine, the purified compound prepared as in Example I hereinabove, and then pressing a portion of the mass between heated platens in a molding press. The "Butvar" resin is a condensation product of butyraldehyde with the partial hydrolysis product of a polyvinyl acetate. The resulting film is flexible, clear and homogeneous. Substantially greater proportions of the plasticizer than those indicated above are not freely compatible and may produce a film characterized by haze. Additional increase in flexibility may be attained by incorporation of other plasticizing agents such as dibutyl phthalate, tributyl phosphate, tricresyl phosphate and the like.

*Example IV.*—Exactly as in Example III, a film is prepared from 25 parts by weight of diacetyl dicyclohexyl ethylene diamine and 100 parts of "Formvar," a resin resulting from the condensation of a partially hydrolyzed vinyl ester polymer and formaldehyde. This film is flexible, clear and homogeneous. These proportions represent approximately the extent of compatibility of the plasticizer with the resin. The films are flexible but if greater flexibility is desired, particularly in films of greater thickness, additional plasticizing agents such as diethyl phthalate and methyl phthalyl ethyl glycolate may be used to supplement the diacetyl dicyclohexyl ethylene diamine.

*Example V.*—As in Example III, 100 parts by weight of "Butvar" resin and 25 parts by weight of diformyl dicyclohexyl ethylene diamine, prepared as in Example II, are kneaded and pressed into a film. The resulting film is clear, homogeneous and flexible.

*Example VI.*—A film is prepared as in Example III, by incorporating 20 parts by weight of diformyl dicyclohexyl ethylene diamine and 100 parts by weight of "Formvar" resin. The film is clear, homogeneous, and flexible.

In general, the "Butvar" is compatible with greater proportions of plasticizer than the "Formvar" resin, and the diacetyl and higher acylated dicyclohexyl ethylene diamines are more freely compatible than the diformyl derivative. With vinyl ester resins the compatibility is even greater than that indicated in the foregoing examples. The plasticizers of the present invention may be used in admixture with supplementary phthalate ester and phosphate ester plasticizers, such as diethyl phthalate, dibutyl phthalate, tributyl phosphate, methyl phthalyl ethyl glycolate, butyl phthalyl butyl glycolate, triphenyl phosphate, tricresyl phosphate, triglycol dihexoate and the like. Additional modifying substances such as fireproofing compounds, coloring materials, fillers, stabilizing agents and the like may also be added. Plastic compositions made with the plasticizers of the present invention are characterized by little or no odor and by an unusual degree of resistance to discoloration by the action of light.

It is to be understood that diformyl and diacetyl dicyclohexyl ethylene diamines merely constitute two typical examples of materials which are embraced within the purview of the present invention. It will be appreciated that ethylene dichloride in the reaction may be replaced by the dichlorides or other halogenated derivatives of aliphatic hydrocarbons, examples of which are butylene dichloride, propylene dichloride, etc. Cyclohexylamine may be replaced by C-alkyl derivatives of cyclohexylamine such as methyl cyclohexylamine and the like and the formic acid and acetic anhydride may be replaced by the anhydrides of other carboxylic acids such as the anhydrides of propionic and butyric acid.

The primary materials require for the preparation of the new compounds are relatively inexpensive to obtain and the reactions involved are simple and easy to effect. The resultant products, by reason of their high compatibility with nitrocellulose and vinyl resins and the permanence and resistance to discoloration of the materials when incorporated into nitrocellulose and vinyl resins, as shown in my co-pending application, Serial No. 43,924, make the compounds highly valuable as plasticizing agents.

The new compounds may be employed as plasticizers in almost any of the conventional lacquer materials which contain, as a base, vinyl resins or nitrocellulose. The compounds are also excellent plasticizers for compositions designed to be shaped by molding or pressing. For this purpose, they may be used alone or in mixture with other plasticizers or softening agents, as hereinbefore indicated.

Although only the preferred forms of the invention have been described and shown, it will be apparent to those skilled in the art that these forms are merely illustrative and that numerous modifications may be made therein without departure from the scope of the invention or of the appended claims.

I claim:

1. A compound of the general formula

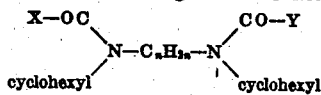

in which the radical —$C_nH_{2n}$— is a lower alkylene radical and the radicals X and Y are lower alkyl radicals.

2. A compound of the general formula

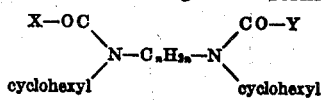

in which the radical —$C_nH_{2n}$— is an aliphatic hydrocarbon radical selected from the group consisting of ethylene, propylene and butylene radicals and X and Y are selected from the group consisting of hydrogen, methyl, ethyl, propyl and butyl radicals.

3. A compound of the general formula

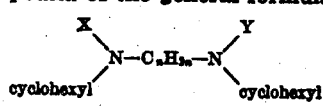

in which the radical —$C_nH_{2n}$— is a lower alkylene radical and the radicals X and Y are acyl groups of lower unsubstituted aliphatic monocarboxylic acids.

4. An N,N'-diformyl-N,N'-dicyclohexyl lower alkylene diamine.

5. An N,N'-diacetyl-N,N'-dicyclohexyl lower alkylene diamine.

6. N,N'-diformyl-N,N'-dicyclohexyl ethylene diamine, said compound, when pure, having a melting point of 162°–163° C.

7. N,N'-diacetyl-N,N'-dicyclohexyl ethylene diamine, said compound, when pure, having a melting point of 152°–154° C.

LUCAS P. KYRIDES.